United States Patent
Jain et al.

(10) Patent No.: US 8,891,822 B2
(45) Date of Patent: Nov. 18, 2014

(54) SYSTEM AND METHOD FOR SCRIPT AND ORIENTATION DETECTION OF IMAGES USING ARTIFICIAL NEURAL NETWORKS

(75) Inventors: Chirag Jain, Karnataka (IN); Chanaveeragouda Virupaxgouda Goudar, Karnataka (IN); Kadagattur Gopinatha Srinidhi, Karnataka (IN); Yifeng Wu, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 213 days.

(21) Appl. No.: 13/442,892

(22) Filed: Apr. 10, 2012

(65) Prior Publication Data
US 2013/0266176 A1  Oct. 10, 2013

(51) Int. Cl.
*G06K 9/00* (2006.01)
*H04N 5/228* (2006.01)

(52) U.S. Cl.
USPC .................. 382/103; 382/321; 348/222.1

(58) Field of Classification Search
CPC ............ G06K 9/00; G06K 9/68; H04N 5/228
USPC ......... 382/100, 103, 112–116, 137, 156, 162, 382/168, 173, 181–186, 190, 203, 206, 209, 382/219–221, 232, 237, 254, 274, 276, 382/286–295, 305, 312, 321, 230, 177; 348/222.1, 231.2
See application file for complete search history.

(56) References Cited

U.S. PATENT DOCUMENTS

| | | | |
|---|---|---|---|
| 7,020,338 B1 * | 3/2006 | Cumbee ........................ | 382/230 |
| 7,392,473 B2 | 6/2008 | Meunier | |
| 8,509,537 B2 * | 8/2013 | Perronnin et al. ............ | 382/186 |
| 8,712,188 B2 | 4/2014 | Roy et al. | |
| 2009/0028435 A1 | 1/2009 | Wu et al. | |
| 2011/0249897 A1 * | 10/2011 | Chaki et al. .................... | 382/177 |
| 2013/0051681 A1 | 2/2013 | Jain et al. | |
| 2013/0194448 A1 * | 8/2013 | Baheti et al. ................ | 348/222.1 |
| 2013/0195376 A1 * | 8/2013 | Baheti et al. .................. | 382/289 |
| 2013/0266176 A1 | 10/2013 | Jain et al. | |

FOREIGN PATENT DOCUMENTS

IN  0264CH2007  9/2009

OTHER PUBLICATIONS

S. Asthana,et.al Handwritten Multiscript Numeral Recognition using Artificial Neural Networks, Intl. Journal of Soft Computing and Engineering (IJSCE) ISSN: 2231-2307, 5 pgs, Mar. 2011.
Shabana Sheikh, Arabic—Urdu Script Recognition through Mouse: An Implementation Using Artificial Neural Network, 2010 Seventh Intl. Conference on Information Technology, 4 pgs.

(Continued)

*Primary Examiner* — Seyed Azarian (57) ABSTRACT

A system and method for script and orientation detection of images using artificial neural networks (ANNs) are disclosed. In one example, textual content in the image is extracted. Further, a vertical component run (VCR) and horizontal component run (HCR) are obtained by vectorizing each connected component in the extracted textual content. Furthermore, a zonal density run (ZDR) is obtained for each connected component in the extracted textual content. In addition, a concatenated vertical document vector (VDV), horizontal document vector (HDV), and zonal density vector (ZDV) is computed by normalizing the obtained VCR, HCR, and ZDR, respectively, for each connected component. Moreover, the script in the image is determined using a script detection ANN module and the concatenated VDV, HDV, and ZDV of the image. Also, the orientation of the image is determined using an orientation detection ANN module and the concatenated VDV, HDV, and ZDV of the image.

20 Claims, 12 Drawing Sheets

(56) References Cited

OTHER PUBLICATIONS

C.C. Funa, V. Iyer, W. Brown, and K.W. Wong, "Comparing the Performance of Different Neural Networks Architectures for the Prediction of Mineral Prospectively," Machine Learning and Cybernetics, 2005. Proceedings of 2005 International Conference on, 2005, pp. 394-398.

Chen et al, "A Method for Detecting Document Orientation by Using SVM Classifier.". Proc. 2011 IEEE Int'l Conf. on Multimedia Technology, Jul. 2011, pp. 47-50.

D. Bloomberg, G. Kopec, and L. Dasari. "Measuring document image skew and orientation," SPIE 2422, pp. 302-316, 1995.

D.S. Le and G.R. Thoma and H. Wechsler, "Automated Page Orientation and Skew Angle Detection for Binary Document Images," Pattern Recognition Letters, 1994.

Deng et al,, "A Method for Detecting Document Orientation by Using Naïve Bayes Classifier," Proc. 2012 IEEE Int'l Conf. on Industrial Control and Electronics Engineering. Aug. 2012, pp. 429-432.

Ghosh et al., "Composite Script Identification and Orientation Detection for Indian Text Images," Proc. 2011 IEEE Int'l Conf. on Document Analysis and Recognition, Sep. 2011, pp. 294-298.

Guo et al., "A Revised Feature Extraction Method for Detecting Text Page Up/Down Orientation," Proc. 2011 IEEE Int'l Conf. on Applied Superconductivity and Electromagnetic Devices, Dec. 2011, pp. 105-108.

H.B. Aradhye, "A generic method for determining up/down orientation of text in roman and non-roman scripts," ICDAR, 2005.

Lu et al., "Automatic Detection of Document Script and Orientation," National University of Singapore, Sep. 2007, vol. 1, pp. 237-241.

Lu et al., "Automatic Document Orientation Detection and Categorization Through Document Vectorization," Proc. 14th ACM Int'l Conf. on Multimedia. Oct. 2006, pp. 113-116.

Lu Shijian, Chew Lim Tan, "Script and Language identification in Noisy and Degraded Document Images," IEEE Transaction on Pattern Analysis and Machine Intelligence, vol. 30, No. 1, Jan. 2008.

N. Otsu, "A Threshold Selection Method from Gray-Level Histogram," IEEE Trans. Systems, Man, Cybernetics, vol. 19, No. 1, pp. 62-66, 1978.

Park et al., "Efficient Word Segmentation Driven by Unconstrained Handwritten Phrase. Recognition, " Proc. 1999 IEEE Int'l Conf. on Document Analysis and Recognition, Sep. 1999, pp. 605-608.

Robert S. Caprari, "Algorithm for text page up/down orientation determination," Pattern Recognition Letters 21, 2000, pp. 311-317.

T. Akiyama and N. Hagita, "Automated entry system for printed documents," Pattern Recognition Letters, 1990.

Unnikrishnan et al., "Combined Script and Page Orientation Estimation Using the Tesseract OCT Engine," Proc. 2009 ACM Int'l Workshop on Multilingual OCR, Jul. 2009, Article No. 6.

Yves Rangoni , Faisal Shafait , Joost Van Beusekom , Thomas M. Breuel, "Recognition-driven page orientation detection," International Conference on Image Processing, Nov. 2009.

\* cited by examiner

| SCRIPT | NUMBER OF IMAGES | SCRIPT ACCURACY | ORIENTATION ACCURACY |
|---|---|---|---|
| CHINESE | 1722 | 98.6% | 97.96% |
| KOREAN | 1552 | 99.87% | 99.54% |
| JAPANESE | 1338 | 95.44% | 99.1% |
| ROMAN | 915 | 98.68% | 98.03% |
| DEVANAGARI | 200 | 100% | 100% |

FIG. 7

| SCRIPT DETECTED AS CHINESE | NUMBER OF IMAGES | SCRIPT ACCURACY |
|---|---|---|
| TRADITIONAL CHINESE | 696 | 90.81% |
| SIMPLIFIED CHINESE | 1002 | 93.51% |

| SCRIPT | NUMBER OF IMAGES | SCRIPT ACCURACY | ORIENTATION ACCURACY |
|---|---|---|---|
| CHINESE | 1724 | 98.49% | 98.7% |
| KOREAN | 1552 | 99.54% | 98.58% |
| JAPANESE | 1333 | 96.99% | 99.39% |
| ROMAN | 900 | 98.66% | 98.88% |
| DEVANAGARI | 200 | 99.5% | 99.5% |

| SCRIPT DETECTED AS CHINESE | NUMBER OF IMAGES | SCRIPT ACCURACY |
|---|---|---|
| TRADITIONAL CHINESE | 701 | 96.29% |
| SIMPLIFIED CHINESE | 997 | 94.68% |

SYSTEM AND METHOD FOR SCRIPT AND ORIENTATION DETECTION OF IMAGES USING ARTIFICIAL NEURAL NETWORKS

BACKGROUND

With increase in the usage of soft version of images, there has been a need for identifying script and their orientations. Currently, manual checks are performed to categorize the images based on scripts and to correct orientation of the images. However, the manual process can be very time consuming and tedious and may not be cost effective during bulk scanning.

Further, rapid growth in digital libraries has necessitated the need for automated systems for identifying script and their orientations in the images. Furthermore, such automated processing may be required before performing optical character recognition (OCR) analysis.

Existing automated techniques for script and orientation detection of the images are not robust enough to accurately detect the script and orientation and/or are highly computationally intensive.

BRIEF DESCRIPTION OF THE DRAWINGS

Examples of the invention will now be described in detail with reference to the accompanying drawings, in which.

The drawings described herein are for illustration purposes only and are not intended to limit the scope of the present disclosure in any way.

DETAILED DESCRIPTION

A system and method for script and orientation detection of images using artificial neural networks (ANNs) are disclosed. In the following detailed description of the examples of the present subject matter, references are made to the accompanying drawings that form a part hereof, and in which are shown by way of illustration specific examples in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present subject matter is defined by the appended claims.

Figure 1:
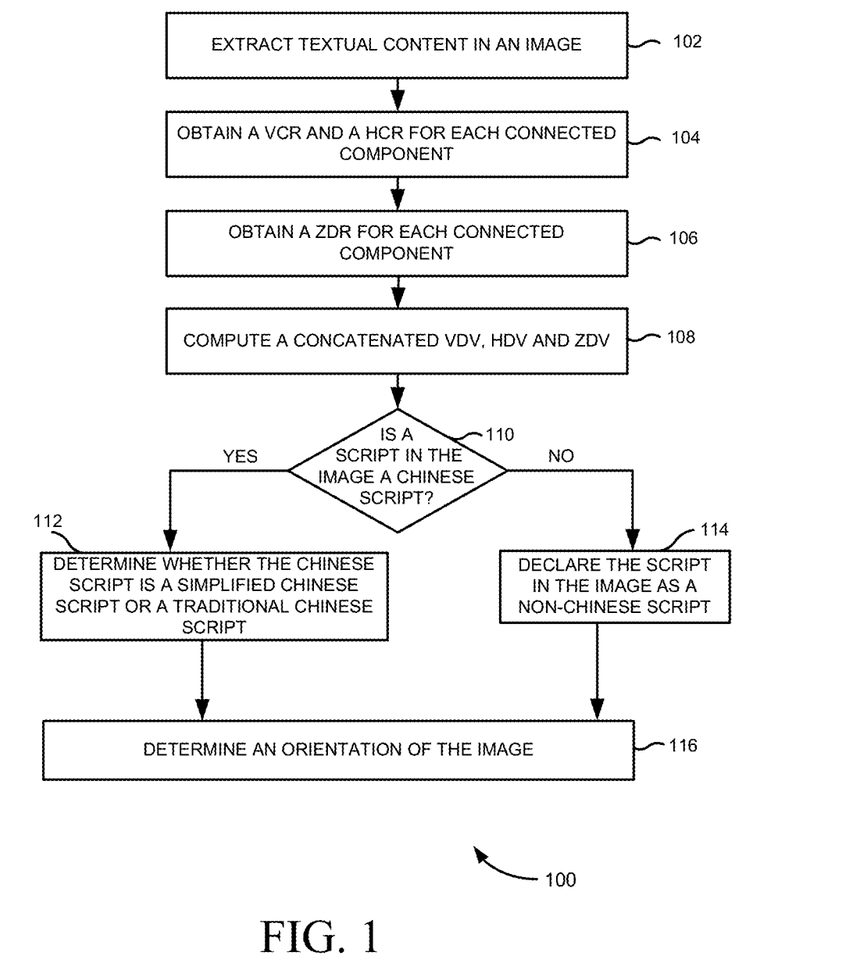
FIG. 1 illustrates a flow diagram of an exemplary method for script and orientation detection of an image using artificial neural networks (ANNs)

FIG. 1 illustrates a flow diagram 100 of an exemplary method for script and orientation detection of images using ANNs. At block 102, textual content in an image is extracted. For example, the image can be a captured and/or a scanned image. Further, the captured and/or scanned image includes textual content. Furthermore, the captured and/or scanned image may also include graphics. For extracting the textual content, a gray level/colored image is obtained by capturing the image using the camera or scanner. Further, a binarized image is obtained from the gray level/colored image. Furthermore, the binarized image is dilated to obtain a dilated image. The dilation is performed on the binarized image to join disjoint parts of characters in the binarized image. In addition, the textual content is identified and extracted by performing a connected component analysis (CCA) and a resolution based thresholding on the dilated image. In one example implementation, the CCA scans the image and groups pixels in the image into components (i.e., connected components) based on pixel connectivity. The connected component is a connected pixel region in the image. The connected pixel region includes regions of adjacent pixels which share some specific features in the image. This is explained below in more detail with reference to FIGS. 2A-2C.

At block 104, a vertical component run (VCR) and horizontal component run (HCR) are obtained by vectorizing each connected component in the extracted textual content. This is explained below in more detail with reference to FIGS. 3 and 4. At block 106, a zonal density run (ZDR) is obtained for each connected component in the extracted textual content. This is explained below in more detail with reference to FIG. 5. At block 108, a concatenated vertical document vector (VDV), horizontal document vector (HDV) and zonal density vector (ZDV) is computed by normalizing the obtained VCR, HCR and ZDR, respectively, for each of the connected components in the extracted textual content. Hereinafter, the concatenated VDV, HDV and ZDV is referred to as a document vector. In context, the document vector of the image is computed by normalizing the obtained VCRs, HCRs and ZDRs of a plurality of connected components in the extracted textual content. This is explained below in more detail with reference to FIGS. 6A-6C.

Further, the script in the image is determined using a script detection ANN module (for example, a script detection ANN module 1130 shown in FIG. 11) and the computed document vector of the image. In this example, a multilayer perceptron (MLP) (e.g., 3 layer MLP) is used. The MLP is a feed forward ANN module that maps sets of input feature parameters onto a set of expected output through multiple layers with linear and non-linear activation functions. Further in this example, an iterative training phase of the script detection ANN module is performed using reference document vectors associated with various scripts, such as a Chinese script, a Korean script, a Japanese script, a Roman script and a Devanagari script. The reference document vector associated with each of the various scripts is obtained using several images of each of the various scripts. Using the reference document vectors, the script detection ANN module maps an input document vector of the image to a target script to detect the script in the image.

In one example embodiment, at block 110, it is determined whether the script in the image is a Chinese script using the script detection ANN module and the document vector of the image. Further, at block 112, it is determined whether the Chinese script is Simplified Chinese script or Traditional Chinese script using a Chinese script detection ANN module (for example, a Chinese script detection ANN module 1132 shown in FIG. 11) and the document vector of the image if the script in the image is the Chinese script. Furthermore, at block 114, the script in the image is declared as a Non-Chinese script if the script in the image is not a Chinese script. For example, the Non-Chinese script includes a Korean script, a Japanese script, a Roman script, a Devanagari script and the like. This is explained in detail with reference to FIG. 11. At block 116, the orientation of the image is determined using an orientation detection ANN module and the computed document vector of the image. In this example, each script has an associated orientation detection ANN module. Therefore, based on the determined script in the image, the orientation of the image is determined using the orientation detection ANN module associated with the detected script and the computed document vector of the image. This is explained in detail with reference to FIG. 11.

Figure 2A:
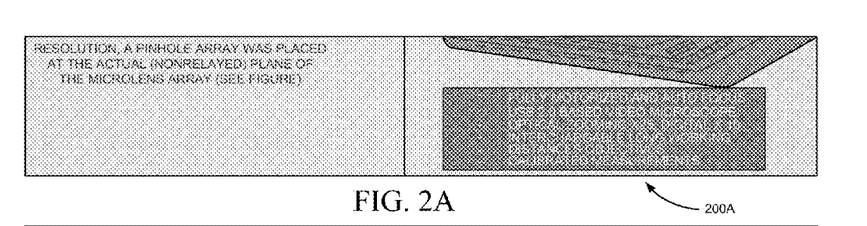
FIGS. 2A-2C are example block diagrams illustrating pre-processing steps of FIG. 1 including textual content extraction in the image.

Referring now to FIG. 2A, an example block diagram 200A illustrates a pre-processing step of FIG. 1, including textual content extraction in the image. Particularly, the block diagram 200A illustrates the gray level/colored image obtained, during the pre-processing step, by capturing the image using a camera and/or a scanner. The gray level/colored image includes text selected from the group consisting of reverse text (i.e., light text on dark background), graphics, and noise. As shown in FIG. 2A, the gray level/colored image includes two different foregrounds and backgrounds. The right half of the gray level/colored image includes reverse text.

Figure 2B:
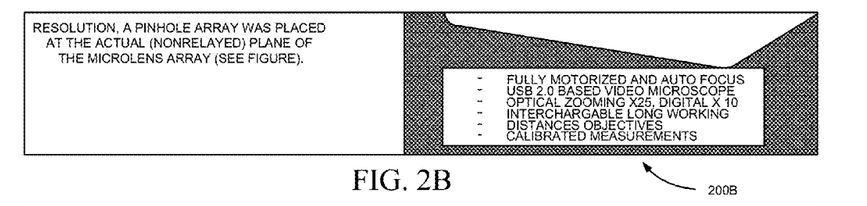

Referring now to FIG. 2B, an example block diagram 200B illustrates the pre-processing step of FIG. 1, including textual content extraction in the image. Particularly, the block diagram 200B illustrates a binarized image obtained, during the pre-processing step, from the gray level/colored image, shown in FIG. 2A. For example, a binarization algorithm, such as an Otsu's algorithm is applied to the gray level/colored image, shown in FIG. 2A, to obtain the binarized image. The Otsu's algorithm for binarization chooses a threshold value which maximizes variance of intensities of foreground and background. In one example implementation, the gray level/colored image, shown in FIG. 2A, is divided into a plurality of sub-images. Further, the Otsu's algorithm is applied locally to identify the background and foreground. Furthermore, the background and foreground intensities are detected by assuming that a considerably larger portion of the gray level/colored image is occupied by the background than the foreground. In addition, the plurality of sub-images with reverse text (i.e., light text on dark background) are inverted to obtain the binarized image, shown in FIG. 2B, with white background and black text.

Figure 2C:
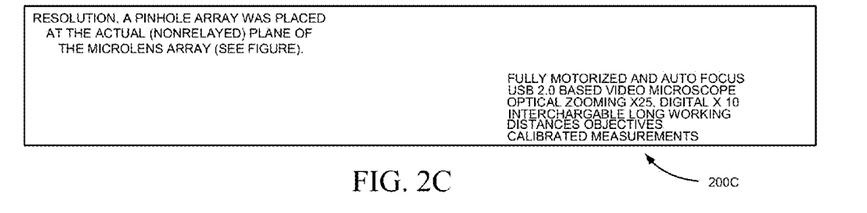

Referring now to FIG. 2C, an example block diagram 200C illustrates the pre-processing step of FIG. 1, including textual content extraction in the image. Particularly, the block diagram 200C illustrates identifying and extracting textual content in the obtained binarized image. In one example implementation, the obtained binarized image, shown in FIG. 2B, is dilated to obtain a dilated image. The dilation is performed on the binarized image to join disjoint parts of characters and to enhance shape of the characters in the binarized image. For example, the characters in Asian languages are composed of one or more parts. In this example, a 3×3 pixel dilation window is used to join the disjoint parts of the characters.

Further, the CCA and resolution based thresholding are performed on the dilated image to identify and extract the textual content, as shown in FIG. 2C. For example, the dilated image is segmented by performing the CCA. Further, the resolution based thresholding is performed to obtain textual content by discarding the noise and graphics.

Figure 3:
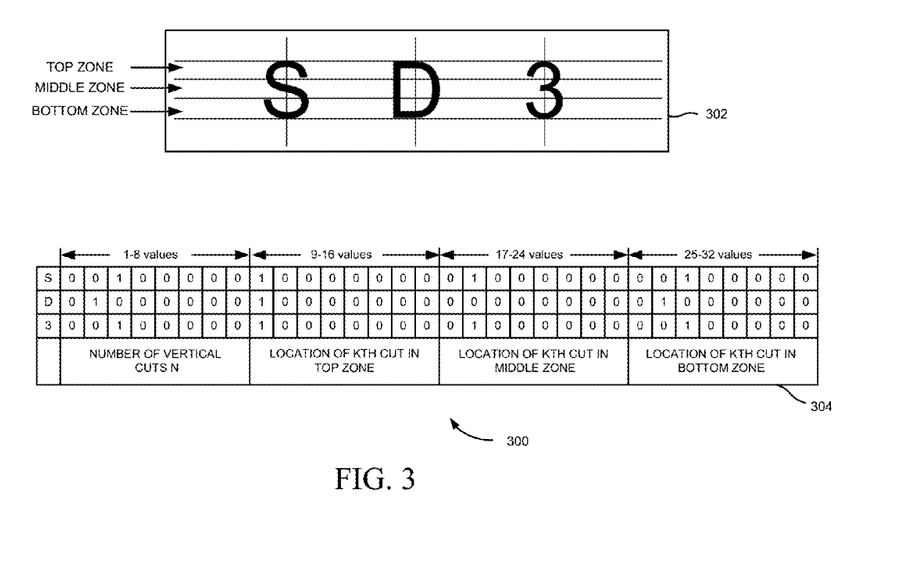
FIG. 3 illustrates an example block diagram of forming three 32-value vertical component runs (VCRs) by vectorizing three exemplary connected components.

Referring now to FIG. 3, an example block diagram 300 illustrates forming 32-value VCRs 304 by vectorizing three exemplary connected components 302. As shown in FIG. 3, each of the three connected components 302 is divided into three zones (i.e., top zone, middle zone, and bottom zone). Further, the 32-value VCRs 304 are generated for the connected components 302 by traversing from top to bottom through the centroid of each of the connected components 302. In this example, the 32-value VCRs 304 are generated for the connected components 302 based on number and locations of vertical cuts in the three zones. Furthermore, a 32-value VDV is computed by normalizing the obtained 32-value VCRs for the connected components in the image.

For example, position of 1 in 1-8 values of one of the 32-value VCRs 304 represents number of vertical cuts in an associated one of the connected components 302. Further, the position of 1's in 9-16 values of the one of the 32-value VCRs 304 represent location of vertical cuts lying in the top zone of the associated one of the connected components 302. Furthermore, the position of 1's in 17-24 values of the one of the 32-value VCRs 304 represent location of vertical cuts lying in the middle zone of the associated one of the connected components 302. In addition, the position of 1's in 25-32 values of the one of the 32-value VCRs 304 represent location of vertical cuts lying in the bottom zone of the associated one of the connected components 302.

Figure 4:
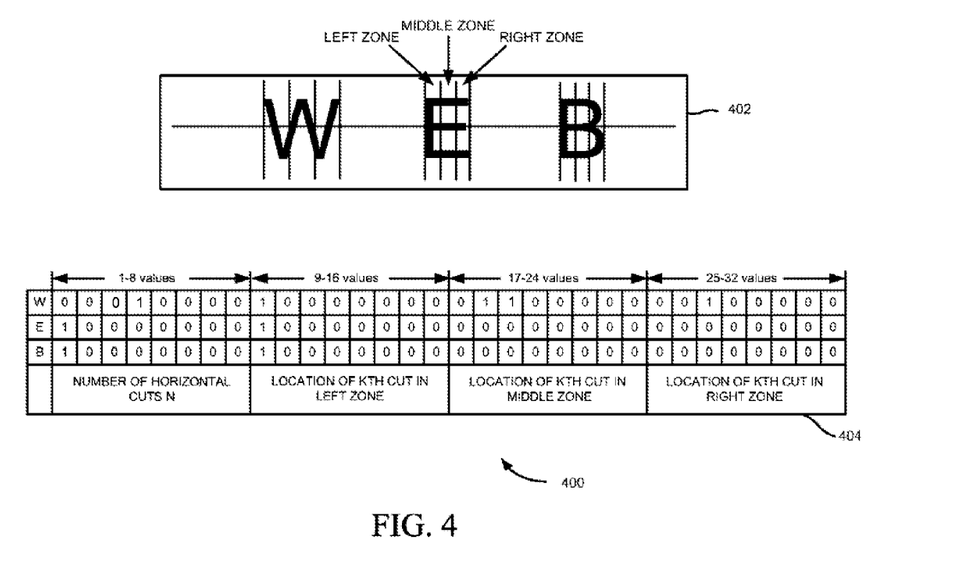
FIG. 4 illustrates an example block diagram of forming three 32-value horizontal component runs (HCRs) by vectorizing three exemplary connected components.

Referring now to FIG. 4, an example block diagram 400 illustrates forming 32-value HCRs 404 by vectorizing three exemplary connected components 402. As shown in FIG. 4, each of the connected components 402 is divided into three zones (i.e., left zone, middle zone, and right zone). Further, the 32-value HCRs 404 are generated for the connected components 402 by traversing from left to right through the centroid of each of the connected components 402. In this example, the 32-value HCRs 404 are generated for the connected components 402 based on number and locations of horizontal cuts in the three zones. Furthermore, a 32-value HDV is computed by normalizing the obtained 32-value HCRs for the connected components in the image.

For example, position of 1 in 1-8 values of one of the 32-value HCRs 404 represents number of horizontal cuts in an associated one of the connected components 402. Further, the position of 1's in 9-16 values of the one of the 32-value HCRs 404 represent location of horizontal cuts lying in the left zone of the associated one of the connected components 402. Furthermore, the position of 1's in 17-24 values of the one of the 32-value HCRs 404 represent location of horizontal cuts lying in the middle zone of the associated one of the connected components 402. In addition, the position of 1's in 25-32 values of the one of the 32-value HCRs 404 represent location of horizontal cuts lying in the right zone of the associated one of the connected components 402.

Figure 5:
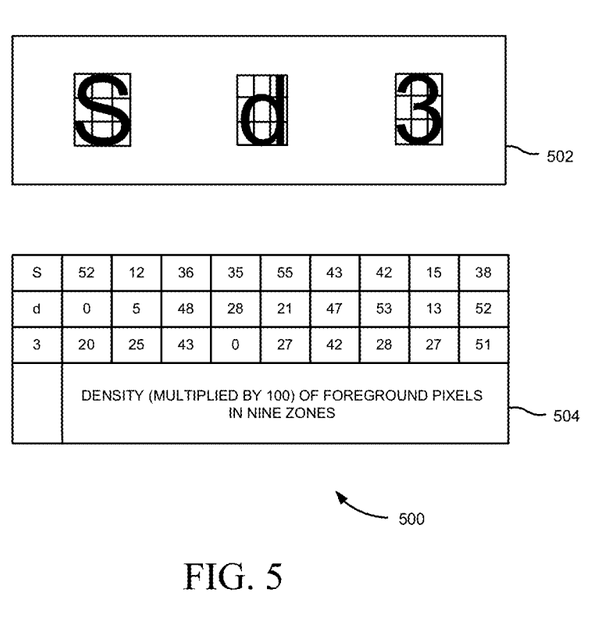
FIG. 5 illustrates an example block diagram of forming three 9-value zonal density runs (ZDRs) for three exemplary connected components.

Referring now to FIG. 5, an example block diagram 500 illustrates forming 9-value ZDRs 504 for three exemplary connected components 502. As shown in FIG. 5, each of the connected components 502 is divided into 9 zones (a 3×3 grid). Further, the 9-value ZDRs 504 are generated for the connected components 502 by computing density of foreground pixels in each of the zones for each of the connected components 502. Furthermore, a 9-value ZDV is computed by normalizing the obtained 9-value ZDRs for the connected components in the image. In this example, the computed 9-value ZDV enables to distinguish between similar scripts, such as Simplified Chinese script and Traditional Chinese script.

Figure 6A:
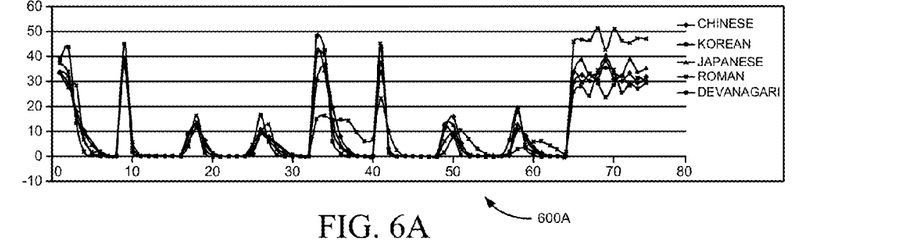
FIGS. 6A-6C are example graphical representations of pre-generated reference templates of various scripts and orientations of the images obtained using an associated average concatenated 73-value vertical document vector (VDV), horizontal document vector (HDV) and ZDV for various scripts and up-down orientations.

Referring now to FIG. 6A, a graphical representation 600A illustrates pre-generated reference templates of various scripts and orientations of the images obtained using an associated document vector for various scripts and up-down orientations. As shown in the graphical representation 600A, the x-axis indicates index position of 73 values of the document vector and the y-axis indicates average distribution of the document vector. In this example, the average distribution of the document vector is multiplied by 100. Further, the various scripts include a Chinese script, a Korean script, a Japanese script, a Roman script and a Devanagari script.

Figure 6B:
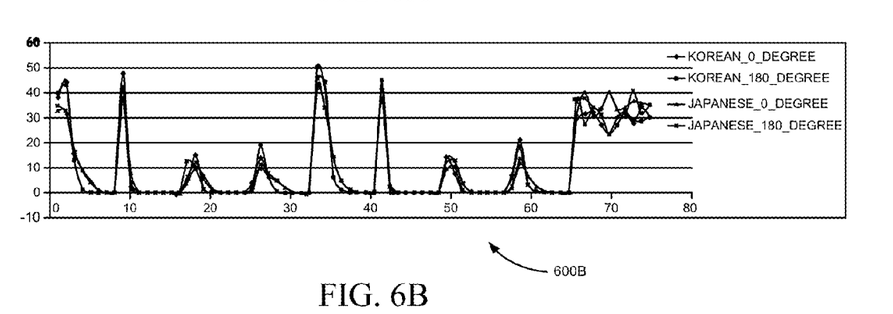

Referring now to FIG. 6B, a graphical representation 600B illustrates pre-generated reference templates of various scripts and orientations of the images obtained using an associated document vector for various scripts and up-down orientations. As shown in the graphical representation 600B, the x-axis indicates the index position of 73 values of the document vector and the y-axis indicates average distribution of the document vector. In this example, the average distribution of the document vector is multiplied by 100. Further, the various scripts and up-down orientations include 0 and 180 degree orientations of Korean script and Japanese script.

Figure 6C:
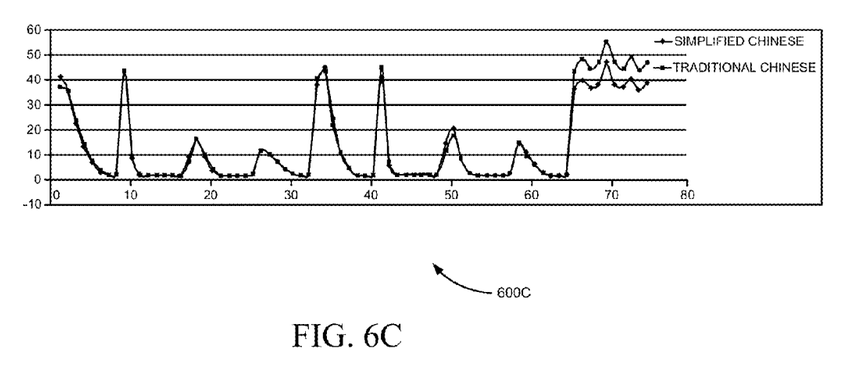

Referring now to FIG. 6C, a graphical representation 600C illustrates pre-generated reference templates of various scripts and orientations of the images obtained using an associated document vector for various scripts and up-down orientations. As shown in the graphical representation 600C, the x-axis indicates the index position of 73 values and the y-axis indicates average distribution of the document vector. In this example, the average distribution of the document vector is multiplied by 100. Further, the various scripts include Simplified Chinese script and Traditional Chinese script.

Figure 7:
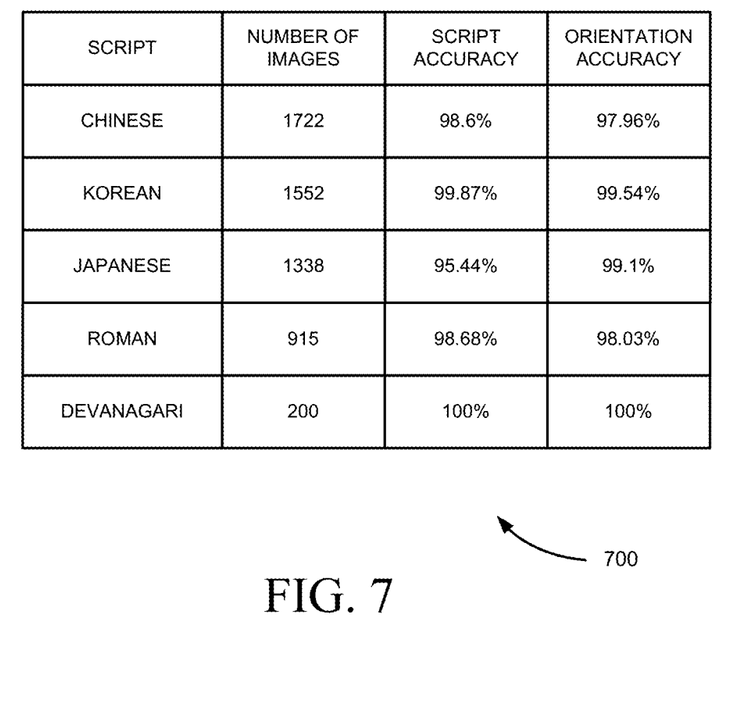
FIG. 7 is an exemplary table including script and orientation detection experimental results as obtained for 150 dots per inch (dpi), using the method of FIG. 1, for various images.

Referring now to FIG. 7, an exemplary table 700 including script and orientation detection experimental results as obtained for 150 dots per inch (dpi), using the method of FIG. 1, for various images. As shown in the table 700, the first column includes the various scripts, such as Chinese script, Korean script, Japanese script, Roman script and Devanagri script. Further, the second column includes the number of images of various scripts used for the detection of script and their orientations. Furthermore, the third column includes the accuracy rate of the detection of scripts. Also, the fourth column includes the accuracy rate of the detection of orientations of the given script.

Figure 8:
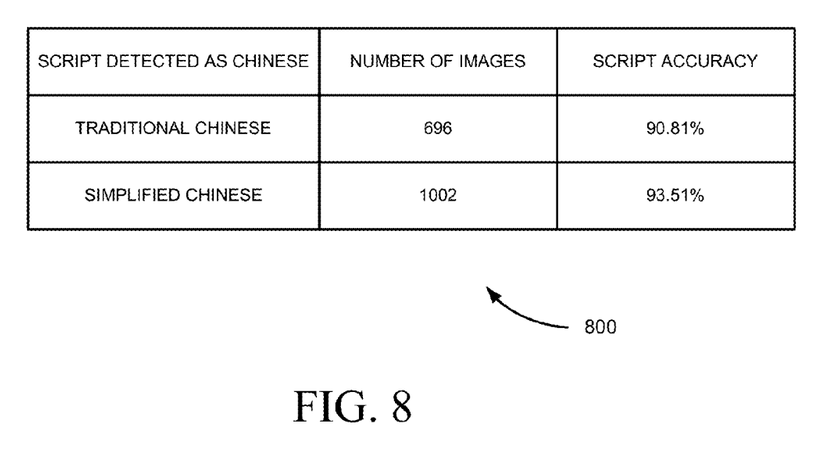
FIG. 8 is an exemplary table including script detection to distinguish between Simplified Chinese script and Traditional Chinese script experimental results as obtained for 150 dpi, using the method of FIG. 1, for various images.

Referring now to FIG. 8, an exemplary table 800 including script detection to distinguish between Simplified Chinese script and Traditional Chinese script experimental results as obtained for 150 dpi, using the method of FIG. 1, for various images. As shown in the table 800, the first column includes the scripts, such as Simplified Chinese script and Traditional Chinese script. Further, the second column includes the number of images of the scripts used for the detection of script. Furthermore, the third column includes the accuracy rate of the detection of the scripts.

Figure 9:
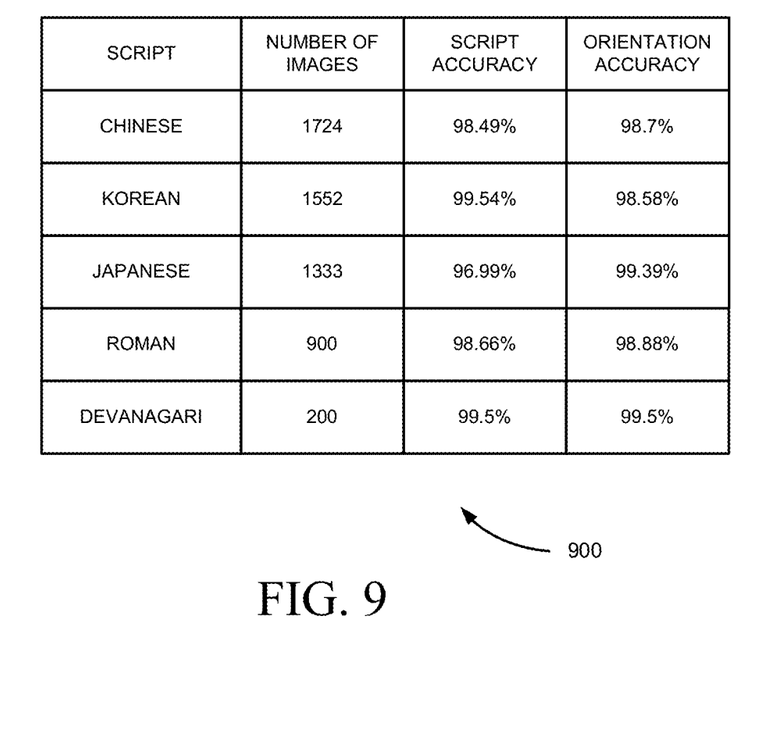
FIG. 9 is an exemplary table including script and orientation detection experimental results for various scripts as obtained for 300 dpi, using the method of FIG. 1, for various images.

Referring now to FIG. 9, an exemplary table 900 including script and orientation detection experimental results for various scripts as obtained for 300 dpi, using the method of FIG. 1, for various images. As shown in the table 900, the first column includes the various scripts, such as Chinese script, Korean script, Japanese script, Roman script and Devanagri script. Further, the second column includes the number of images of various scripts used for the detection of script and orientations. Furthermore, the third column includes the accuracy rate of the detection of scripts. Also, the fourth column includes the accuracy rate of the detection of orientations of the given script.

Figure 10:
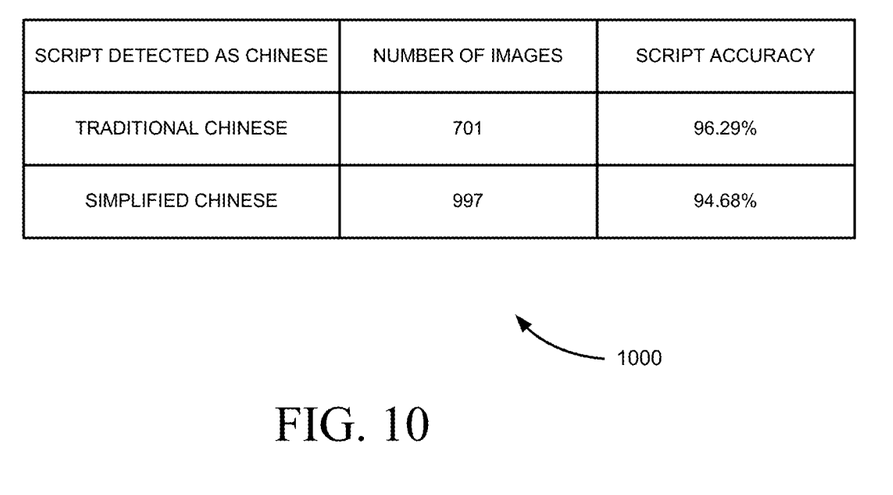
FIG. 10 is an exemplary table including script detection to distinguish between Simplified Chinese script and Traditional Chinese script experimental results as obtained for 300 dpi, using the method of FIG. 1, for various images.

Referring now to FIG. 10, an exemplary table 1000 including script detection to distinguish between Simplified Chinese script and Traditional Chinese script experimental results as obtained for 300 dpi, using the method of FIG. 1, for various images. As shown in the table 1000, the first column includes the scripts, such as Simplified Chinese script and Traditional Chinese script. Further, the second column includes the number of images of the scripts used for the detection of script. Furthermore, the third column includes the accuracy rate of the detection of the scripts.

Figure 11:
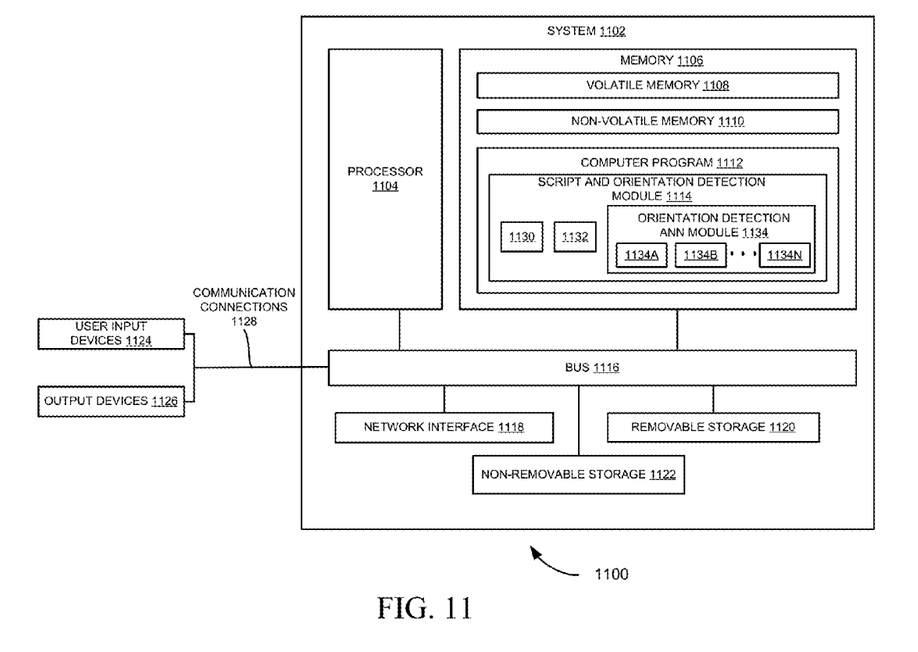
FIG. 11 is an example system including a script and orientation detection module for script and orientation detection of the images, using the method of FIG. 1.

Referring now to FIG. 11, which illustrates an example system 1102 including a script and orientation detection module 1114 for detecting script and orientation of images, using the process shown in FIG. 1. FIG. 11 and the following discussions are intended to provide a brief, general description of a suitable computing environment in which certain examples of the inventive concepts contained herein are implemented.

The system 1102 includes a processor 1104, memory 1106, a removable storage 1120, and a non-removable storage 1122. The system 1102 additionally includes a bus 1116 and a network interface 1118. As shown in FIG. 11, the system 1102 includes access to the computing system environment 1100 that includes one or more user input devices 1124, one or more output devices 1126, and one or more communication connections 1128 such as a network interface card and/or a universal serial bus connection.

Exemplary user input devices 1124 include a digitizer screen, a stylus, a trackball, a keyboard, a keypad, a mouse and the like. Exemplary output devices 1126 include a display unit of the personal computer, a mobile device, and the like. Exemplary communication connections 1128 include a local area network, a wide area network, and/or other network.

The memory 1106 further includes volatile memory 1108 and non-volatile memory 1110. A variety of computer-readable storage media are stored in and accessed from the memory elements of the system 1102, such as the volatile memory 1108 and the non-volatile memory 1110, the removable storage 1120 and the non-removable storage 1122. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 1104, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1104 also includes embedded controllers, such as generic or programmable logic devices or arrays, application specific integrated circuits, single-chip computers, smart cards, and the like.

Examples of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 1104 of the system 1102. For example, a computer program 1112 includes machine-readable instructions capable of detecting script and orientation of images in the system 1102, according to the teachings and herein described examples of the present subject matter. In one example, the computer program 1112 is included on a compact disk-read only memory (CD-ROM) and loaded from the CD-ROM to a hard drive in the non-volatile memory 1110. The machine-readable instructions cause the system 1102 to encode according to the various examples of the present subject matter.

As shown in FIG. 11, the computer program 1112 includes the script and orientation detection module 1114. Further, the script and orientation detection module 1114 includes a script detection ANN module 1130, a Chinese script detection ANN module 1132 and an orientation detection ANN module 1134. Furthermore, the orientation detection ANN module 1134 includes a plurality of orientation detection ANN modules 1134A-N. For example, the script and orientation detection module 1114 can be in the form of instructions stored on a non-transitory computer-readable storage medium. The non-transitory computer-readable storage medium having the instructions that, when executed by the system 1102, causes the system 1102 to perform the method described in FIG. 1.

The script and orientation detection module 1114 extracts textual content in the image. In one example implementation, the script and orientation detection module 1114 obtains the gray level/colored image by capturing the image using the camera or scanner. Further, the script and orientation detection module 1114 obtains the binarized image from the gray level/colored image. Furthermore, the script and orientation detection module 1114 dilates the binarized image to join disjoint parts of characters in the binarized image. In addition, the script and orientation detection module 1114 identifies and extracts the textual content by performing a connected component analysis and a resolution based thresholding on the dilated image.

Further, the script and orientation detection module 1114 obtains the VCR, HCR, and ZDR by vectorizing each connected component in the extracted textual content in the image. Furthermore, the script and orientation detection module 1114 computes a document vector by normalizing the obtained VCR, HCR and ZDR for each connected component in the image. In addition, the script and orientation detection module 1114 determines the script in the image using the script detection ANN module 1130 and the document vector of the image. In one example, the script and orientation detection module 1114 determines whether the script in the image is a Chinese script using the script detection ANN module 1130 and the document vector of the image. Further, the script and orientation detection module 1114 determines whether the Chinese script is a Simplified Chinese script or Traditional Chinese script using the Chinese script detection ANN module 1132 and the document vector of the image if the script in the image is the Chinese script.

Furthermore, the script and orientation detection module 1114 declares the script in the image as a Non-Chinese script if the script in the image is not the Chinese script. For example, the Non-Chinese script includes a Korean script, a Japanese script, a Roman script, a Devanagari script and the like. Also, the script and orientation detection module 1114 determines the orientation of the image using the orientation detection ANN module 1134 and the document vector of the image. In one example, the script and orientation detection module 1114 determines the orientation of the image using one of the plurality of orientation detection ANN modules 1134A-N associated with the detected script and the document vector of the image. Further, an orientation detection ANN module for Traditional Chinese script detects 0, 180, 90 and 270 degree orientations. The orientation detection ANN modules for the scripts, such as Simplified Chinese script, Korean script, Devanagari script and Roman script detects 0 and 180 degree orientations.

In various examples, system and method described in FIGS. 1 through 11 propose a technique to detect script and orientation of an image using ANNs. The technique enables to distinguish between Simplified Chinese script and Traditional Chinese script using zonal density information obtained from ZDV in addition to cut information obtained from the VDV and HDV. Further, the technique enables to determine script and orientation of various scripts, such as Korean script, Japanese script, Roman script, and Devanagari script using the script detection ANN module and an associated orientation detection ANN module. In addition, the technique enables to detect 0, 180, 90 and 270 degree orientations for Traditional Chinese script which includes vertical and horizontal text lines.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for script and orientation detection of an image using artificial neural networks (ANNs), comprising:

extracting textual content in the image;

obtaining a vertical component run (VCR) by vectorizing each connected component in the extracted textual content into a plurality of horizontal zones and determining a number of vertical cuts in each of the plurality of horizontal zones for each connected component in the extracted textual component;

obtaining a horizontal component run (HCR) by vectorizing each connected component in the extracted textual content into a plurality of vertical zones and determining a number of horizontal cuts in each of the plurality of vertical zones for each connected component in the extracted textual component;

obtaining a zonal density run (ZDR) for each connected component in the extracted textual content;

computing a concatenated vertical document vector (VDV), horizontal document vector (HDV), and zonal density vector (ZDV) by normalizing the obtained VCR, HCR, and ZDR, respectively, for each connected component in the image;

determining the script in the image using a script detection ANN module and the computed concatenated VDV, HDV, and ZDV of the image; and determining the orientation of the image using an orientation detection ANN module and the computed concatenated VDV, HDV, and ZDV of the image.

2. The method of claim 1, wherein the image comprises a captured and/or a scanned image.

3. The method of claim 1, wherein extracting the textual content in the image comprises: obtaining one of a gray level and a colored image by capturing the image using a camera or a scanner; obtaining a binarized image from the one of the gray level and colored image; dilating the binarized image to join disjoint parts of characters in the binarized image; and identifying and extracting the textual content by performing a connected component analysis and a resolution based thresholding on the dilated image.

4. The method of claim 1, wherein determining the orientation of the image using the orientation detection ANN module and the computed concatenated VDV, HDV, and ZDV of the image comprises: determining the orientation of the image using an orientation detection ANN module associated with the determined script in the image and the computed concatenated VDV, HDV, and ZDV of the image.

5. The method of claim 1, wherein each connected component in the extracted textual component is a character.

6. The method of claim 5, wherein each vertical cut in a given character in the extracted textual component corresponds to a line segment of the given character crossing a vertical centroid of the given character.

7. The method of claim 6, wherein the VCR for the given character comprises data that identifies a total number of vertical cuts for the given character and a location in the plurality of horizontal zones of the given character for each of the total number vertical cuts.

8. The method of claim 5, wherein each horizontal cut in a given character in the extracted textual component corresponds to a line segment of the given character crossing a horizontal centroid of the given character.

9. The method of claim 8, wherein the HCR for the given character comprises data that identifies a total number of horizontal cuts for the given character and a location in the plurality of horizontal zones of the given character for each of the total number horizontal cuts.

10. A method for script and orientation detection of an image using artificial neural networks (ANNs), comprising:
    extracting textual content in the image;
    obtaining a vertical component run (VCR) and a horizontal component run (HCR) by vectorizing each connected component in the extracted textual content;
    obtaining a zonal density run (ZDR) for each connected component in the extracted textual content;
    computing a concatenated vertical document vector (VDV), horizontal document vector (HDV), and zonal density vector (ZDV) by normalizing the obtained VCR, HCR, and ZDR, respectively, for each connected component in the image;
    determining the script in the image using a script detection ANN module and the computed concatenated VDV, HDV, and ZDV of the image; and
    wherein determining the script in the image using the script detection ANN module and the computed concatenated VDV, HDV, and ZDV of the image comprises:
        determining whether the script in the image is a Chinese script using the script detection ANN module and the computed concatenated VDV, HDV, and ZDV of the image; and
        determining, in response to determining that the script is a Chinese script, whether the Chinese script is a Simplified Chinese script or a Traditional Chinese script using a Chinese script detection ANN module and the computed concatenated VDV, HDV, and ZDV of the image;
        determining the orientation of the image using an orientation detection ANN module and the computed concatenated VDV, HDV, and ZDV of the image.

11. The method of claim 10, further comprising: declaring, in response to determining the script is not a Chinese script, the script in the image as a non-Chinese script, wherein the non-Chinese script is selected from the group consisting of a Korean script, a Japanese script, a Roman script, and a Devanagari script.

12. A system for script and orientation detection of an image using artificial neural networks (ANNs), comprising:
    a processor; and
    memory coupled to the processor; and
    a script and orientation detection module residing in the memory, wherein the script and orientation detection module comprises: a script detection ANN module; and
    an orientation detection ANN module, wherein the script and orientation detection module extracts textual content in the image,
    wherein the script and orientation detection module obtains a vertical component run (VCR) by vectorizing each connected component in the extracted textual content into a plurality of horizontal zones and determining a number of vertical cuts in each of the plurality of horizontal zones for each connected component in the extracted textual component,
    wherein the script and orientation detection module obtains a horizontal component run (HCR) by vectorizing each connected component in the extracted textual content into a plurality of vertical zones and determining a number of horizontal cuts in each of the plurality of vertical zones for each connected component in the extracted textual component,
    wherein the script and orientation detection module obtains a zonal density run (ZDR) for each connected component in the extracted textual content,
    wherein the script and orientation detection module computes a concatenated vertical document vector (VDV), horizontal document vector (HDV), and zonal density vector (ZDV) by normalizing the obtained VCR, HCR, and ZDR, respectively, for each connected component in the image,
    wherein the script detection ANN module determines the script in the image using the computed concatenated VDV, HDV, and ZDV of the image, and
    wherein the orientation detection ANN module determines the orientation of the image using the computed concatenated VDV, HDV, and ZDV of the image.

13. The system of claim 12, wherein the script and orientation detection module is further configured to:
    obtain one of a gray level and colored image by capturing the image using a camera or a scanner;
    obtain a binarized image from the one of the gray level and colored image; dilate the binarized image to join disjoint parts of characters in the binarized image; and
    identify and extract the textual content by performing a connected component analysis and a resolution based thresholding on the dilated image.

14. The system of claim 12, wherein the script detection ANN module is further configured to:
    determine whether the script in the image is a Chinese script using the script detection ANN module and the computed concatenated VDV, HDV, and ZDV of the image; and
    determine, in response to determining that the script is a Chinese script, whether the Chinese script is a Simplified Chinese script or a Traditional Chinese script using a Chinese script detection ANN module and the computed concatenated VDV, HDV, and ZDV of the image.

15. The system of claim 14, wherein the script detection ANN module is further configured to: declare the script in the image as a non-Chinese script, in response to determining the script is not a Chinese script, wherein the non-Chinese script is selected from the group consisting of a Korean script, a Japanese script, a Roman script, and a Devanagari script.

16. The system of claim 12, wherein the orientation detection ANN module is further configured to: determine the orientation of the image using an orientation detection ANN module associated with the determined script in the image and the computed concatenated VDV, HDV, and ZDV of the image.

17. A non-transitory computer-readable storage medium for script and orientation detection of images having instructions that when executed by a computing device, cause the computing device to:
extract textual content in the image;
obtain a vertical component run (VCR) by vectorizing each connected component in the extracted textual content into a plurality of horizontal zones and determining a number of vertical cuts in each of the plurality of horizontal zones for each connected component in the extracted textual component;
obtain a horizontal component run (HCR) by vectorizing each connected component in the extracted textual content into a plurality of vertical zones and determining a number of horizontal cuts in each of the plurality of vertical zones for each connected component in the extracted textual component;
obtain a zonal density run (ZDR) for each connected component in the extracted textual content;
compute a concatenated vertical document vector (VDV), horizontal document vector (HDV), and zonal density vector (ZDV) by normalizing the obtained VCR, HCR, and ZDR, respectively, for each connected component in the image;
determine the script in the image using a script detection ANN module and the computed concatenated VDV, HDV, and ZDV of the image; and
determine the orientation of the image using an orientation detection ANN module and the computed concatenated VDV, HDV, and ZDV of the image.

18. The non-transitory computer-readable storage medium of claim 17, wherein determining the script in the image using the script detection ANN module and the computed concatenated VDV, HDV, and ZDV of the image comprises:
determining whether the script in the image is a Chinese script using the script detection ANN module and the computed concatenated VDV, HDV, and ZDV of the image; and
determining, in response to determining that the script is a Chinese script, whether the Chinese script is a Simplified Chinese script or a Traditional Chinese script using a Chinese script detection ANN module and the computed concatenated VDV, HDV, and ZDV of the image.

19. The non-transitory computer-readable storage medium of claim 18, further comprising: declaring, in response to determining the script is not a Chinese script, the script in the image as a non-Chinese script, wherein the non-Chinese script is selected from the group consisting of a Korean script, a Japanese script, a Roman script, and a Devanagari script.

20. A non-transitory computer-readable storage medium for script and orientation detection of images having instructions that when executed by a computing device, cause the computing device to:
extract textual content in the image;
wherein extracting the textual content in the image comprises:
obtaining a one of a gray level image and a colored image by capturing the image using a camera or a scanner;
obtaining a binarized image from the one of the gray level and colored image;
dilating the binarized image to join disjoint parts of characters in the binarized image; and
identifying and extracting the textual content by performing a connected component analysis and a resolution based thresholding on the dilated image;
obtain a vertical component run (VCR) and a horizontal component run (HCR) by vectorizing each connected component in the extracted textual content;
obtain a zonal density run (ZDR) for each connected component in the extracted textual content;
compute a concatenated vertical document vector (VDV), horizontal document vector (HDV), and zonal density vector (ZDV) by normalizing the obtained VCR, HCR, and ZDR, respectively, for each connected component in the image;
determine the script in the image using a script detection ANN module and the computed concatenated VDV, HDV, and ZDV of the image; and
determine the orientation of the image using an orientation detection ANN module and the computed concatenated VDV, HDV, and ZDV of the image.

* * * * *